US010459641B2

United States Patent
Amit et al.

(10) Patent No.: US 10,459,641 B2
(45) Date of Patent: Oct. 29, 2019

(54) EFFICIENT SERIALIZATION OF JOURNAL DATA

(71) Applicant: INTERNATIONAL BUSINESS MACHINES CORPORATION, Armonk, NY (US)

(72) Inventors: Jonathan Amit, Omer (IL); Yifat Kuttner, Kochav Yair (IL); Sergey Marenkov, Tel Aviv (IL); Ben Sasson, Yaffo (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 62 days.

(21) Appl. No.: 14/223,471

(22) Filed: Mar. 24, 2014

(65) Prior Publication Data
US 2015/0268878 A1    Sep. 24, 2015

(51) Int. Cl.
*G06F 3/06* (2006.01)
*G06F 11/14* (2006.01)
*G06F 11/00* (2006.01)

(52) U.S. Cl.
CPC ............ *G06F 3/0619* (2013.01); *G06F 3/061* (2013.01); *G06F 3/065* (2013.01); *G06F 3/0656* (2013.01); *G06F 3/0665* (2013.01); *G06F 3/0676* (2013.01); *G06F 3/0689* (2013.01); *G06F 11/00* (2013.01); *G06F 11/1471* (2013.01); *G06F 2201/855* (2013.01)

(58) Field of Classification Search
CPC .............. G06F 3/065; G06F 17/30191; G06F 17/30185; G06F 2201/855; G06F 3/0656; G06F 3/0689
See application file for complete search history.

(56) References Cited

U.S. PATENT DOCUMENTS

| | | | |
|---|---|---|---|
| 7,953,819 B2* | 5/2011 | Liang | G06F 17/30067 707/610 |
| 8,495,110 B2 | 7/2013 | Aronovich et al. | |
| 9,350,595 B1* | 5/2016 | Yadav | H04L 29/06027 |
| 2006/0047713 A1* | 3/2006 | Gornshtein | G06F 17/30575 707/202 |
| 2006/0155946 A1* | 7/2006 | Ji | G06F 3/0617 711/162 |
| 2010/0223235 A1* | 9/2010 | Fachan | G06F 11/1471 707/690 |
| 2012/0109895 A1* | 5/2012 | Zwilling | G06F 11/1471 707/648 |
| 2013/0117326 A1* | 5/2013 | De Smet | G06F 9/4428 707/798 |
| 2015/0193487 A1* | 7/2015 | Demidov | G06F 17/30327 707/756 |

FOREIGN PATENT DOCUMENTS

WO    2013112634 A1    8/2013
WO    WO 2013129988 A2 *    9/2013 ........ G06F 17/30961

OTHER PUBLICATIONS

Sarp Oral, "Efficient Object Storage Journaling in a Distributed Parallel File System" Sun Microsystem Inc., National Center for Computational Sciences.

* cited by examiner

*Primary Examiner* — Masud K Khan
(74) *Attorney, Agent, or Firm* — Griffiths & Seaton PLLC

(57) ABSTRACT

For efficient serialization of journal data using a processor device, serialization is combined with journaling of data into one data storage system on a write operation with subsequent consolidation for serialization of the journal data.

11 Claims, 6 Drawing Sheets

EFFICIENT SERIALIZATION OF JOURNAL DATA

BACKGROUND OF THE INVENTION

Field of the Invention

The present invention relates in general to computers, and more particularly to efficient serialization of journal data in a computing environment.

Description of the Related Art

In today's society, computer systems are commonplace. Computer systems may be found in the workplace, at home, or at school, such as a data processing system. A data processing system typically includes a processor subsystem having at least one central processing unit (CPU), an input/output (I/O) subsystem, a memory subsystem and a bus subsystem. The memory subsystem of the data processing system typically includes a data storage system having a controller connected to a back end storage. The controller controls the flow of data between the data processing system and the back end storage. The controller includes a cache memory that is typically implemented by static memories. During operation, the cache memory serves as a temporary store for data associated with a write I/O request.

These data processing systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent reliability demands and improving computing efficiency for keeping data storage costs low. Accordingly, it would be desirable to reduce load object latency while input/output latency low in a data storage system.

SUMMARY OF THE DESCRIBED EMBODIMENTS

In one embodiment, a method is provided for efficient serialization of journal data using at least one processor device, in a computing environment. In one embodiment, by way of example only, serialization is combined with journaling of data into one data storage system on a write operation with subsequent consolidation for serialization of the journal data.

In another embodiment, a computer system is provided for efficient serialization of journal data, in a computing environment. The computer system includes a computer-readable medium and at least one processor device in operable communication with the computer-readable medium. The processor device combines serialization with journaling of data into one data storage system on a write operation with subsequent consolidation for serialization of the journal data.

In a further embodiment, a computer program product is provided for efficient serialization of journal data, in a computing environment. The computer-readable storage medium has computer-readable program code portions stored thereon. The computer-readable program code portions include a first executable portion that combines serialization with journaling of data into one data storage system on a write operation with subsequent consolidation for serialization of the journal data.

In addition to the foregoing exemplary method embodiment, other exemplary system and computer product embodiments are provided and supply related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
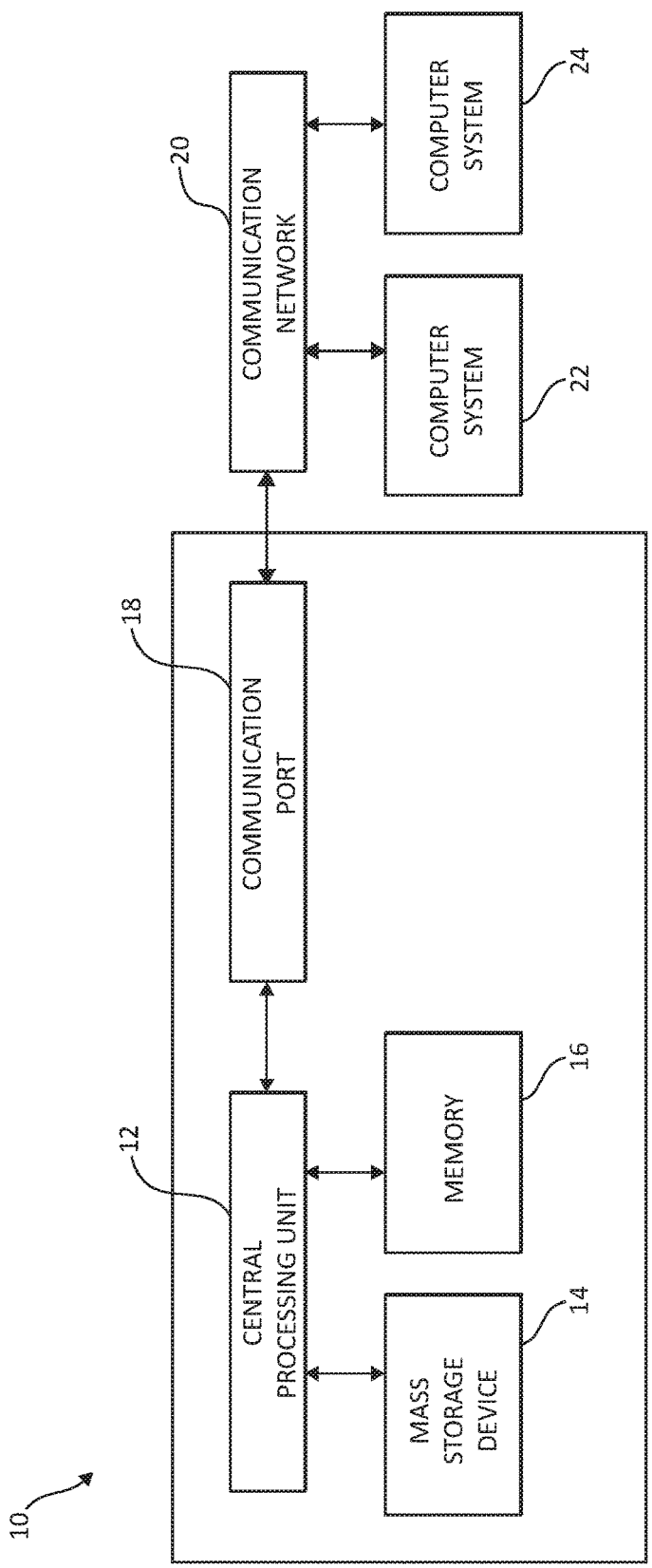
FIG. 1 is a block diagram illustrating a computing system environment having an example storage device in which aspects of the present invention may be realized.

In a data storage system, metadata is managed using in-memory data structures as long as an object is opened. When closing the object, the meta-data is saved to a disk. When opening the object, the meta-data is loaded and in-memory data structures are recreated representing the state of the object at the closing time. Storing metadata on a disk may be performed by a variety of types of operations, such as a journaling operation and/or a serialization operation.

Additionally, in a journaling storage system, the stored metadata represents only the changes made to the object. The system keeps a record for every modification. By reading the records from the disk, and 'replaying' the write actions on blank memory structures, the system may recreate the original data structure and provide a valid description of the object memory map. Saving a record for each user write input/output (I/O) is a very efficient action, decreasing the I/O operation latency and improving storage performance during write.

Storage systems, such as databases and primitive file systems implementations, may use journaling to store data for a brief period of time for the purpose of transaction management and rollbacks and migrate it into another location. This is not the case of journaling systems, as described herein, where the data is kept in journal form throughout its entire life cycle.

When re-opening an object, the storage system is required to read the entire records history in order to build the in-memory data structures. Because this is a journal of all modifications ever made, some records will invalidate already processed records, and in turn, maybe be invalidated by future ones. These actions, even when using efficient data structures, take some time and increases the response time for opening objects. This reduces the total system performance, especially in systems where objects are being opened and closed very frequently.

On the other hand, serialization is an operation for taking a data structure (e.g., a graph of objects, a call stack, and the like) and converting it to a stream of data in a particular external format. At deserialization, the stream of data is converted back into the data structure with the same topology of the original data structure. Serialization facilitates inter-process communication such as transmissions between address spaces, or persistence such as storage on a non-volatile media. For example, an executable program can be serialized at a server end and transferred over to an application running on a client end for executing the executable program at the client. Additionally, an object can be serialized and stored in contiguous memory to save space. Inter-process communications and object persistence are fundamental techniques used in many software applications.

Moreover, in the serialization operation, the in-memory data structures of the object are converted to a general stream of bits, representing the memory used by the data structure. The serialized stream is then saved to the disk. When re-opening an object, the in-memory data structures are easily reconstructed by loading serialized data from memory, with minimum processing. Reconstructing data structures from the serialized stream is a very efficient action, regardless of the specific data structure used, reducing the object open latency.

However, since the serialized stream represents data structures at a specific point in time, any access to data structures during serialization action is not allowed. Meaning that while saving in-memory structures to memory the user write actions are blocked, and response time increases. A storage system therefore chooses one of the meta-data storing operations to suite its requirements. The storage system, for improving efficiency, should keep latency low while storing the journal meta-data, reduce costs in high latency while loading an object, and/or serialize the data to improve the loading time of the object while increasing latency during writes.

Therefore, a need exists for improving the journaling based storage system performance for reducing load object latency while keeping user-I/O low latency. This is achieved by a unique way of combining serialization and journaling together in one storage system. Combining journaling and serialization requires adjustments to object loading action, which is now required to deal with two types of meta-data, and also requires fine-tuning for the timing of replacing saved journal data (e.g., journal meta-data) with serialized meta-data while keeping data integrity. It should be noted that the present invention may apply to journal data and/or journal meta-data. In other words, as described herein, the term "journal data" may be interchanged with the term "journal meta-data" for applying the various embodiments described herein. Similarly, the term "serialized data" may be interchanged with the term "serialized meta-data."

In one embodiment, the present invention provides for efficient serialization of journal data, by combining serialization with journaling of data into one data storage system on a write operations with a subsequent consolidation for serialization of the journal data. In one embodiment, the present invention may be integrated into existing journaling storage system implementations, leaving the internals of the system unchanged. Integrating both serialization and journaling together gains the best of both worlds while negating the drawbacks arises when each method is used separately. In addition, the present invention achieves the benefits of both methods and improving system performance, and, in general, is not concerned with the specific implementation of journaling and serialization functions, nor with the specific data structures used in the system.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
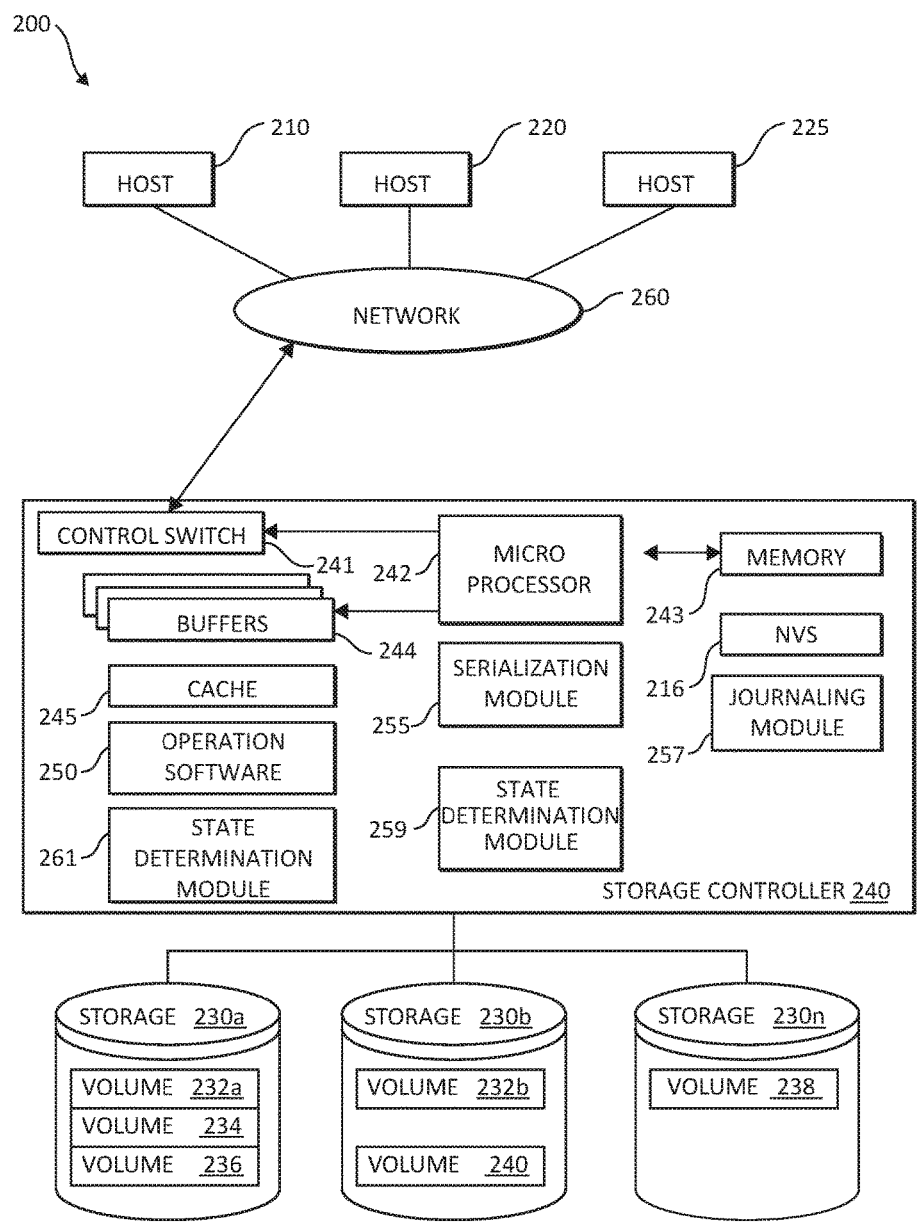
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a serialization module 255, a journaling module 257, and a state determination module 259. The serialization module 255, the journaling module 257, the state determination module 259 may work in conjunction with each and every component of the storage controller 240, the hosts 210, 220, 225, and storage devices 230. The serialization module 255, the journaling module 257, the state determination module 259 may be structurally one complete module or may be associated and/or included with other individual modules. The serialization module 255, the journaling module 257, the state determination module 259, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the serialization module 255, the journaling module 257, the state determination module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, serialization module 255, the journaling module 257, the state determination module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the serialization module 255, the journaling module 257, the state determination module 259, may also be located in the cache 245 or other components. As such, one or more of the serialization module 255, the journaling module 257, the state determination module 259, maybe used as needed, based upon the storage architecture and users preferences.

Figure 3:
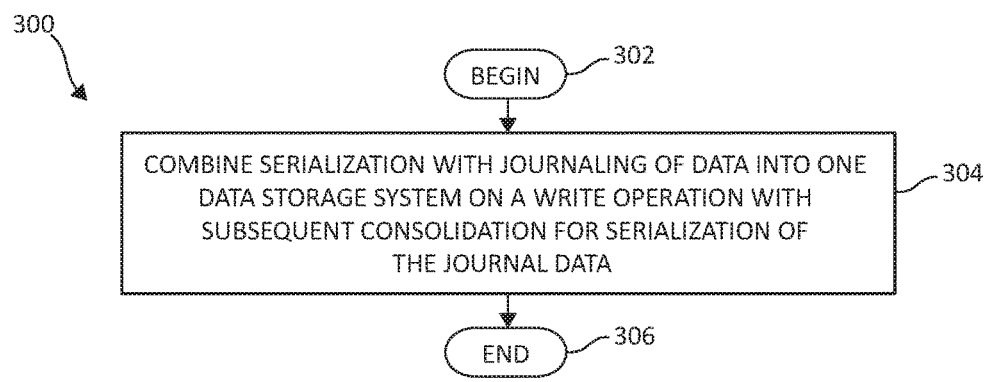
FIG. 3 is a flowchart illustrating an exemplary method for efficient serialization of journal data in which aspects of the present invention may be realized.

FIG. 3 is a flowchart illustrating an exemplary method 300 for efficient serialization of journal data in which aspects of the present invention may be realized. The method 300 begins (step 302) by combining serialization with journaling of data (and/or journaling of meta-data) into one data storage system on a write operation with subsequent consolidation for serialization of the journal data (step 304). The method 300 ends (step 306).

Figure 4:
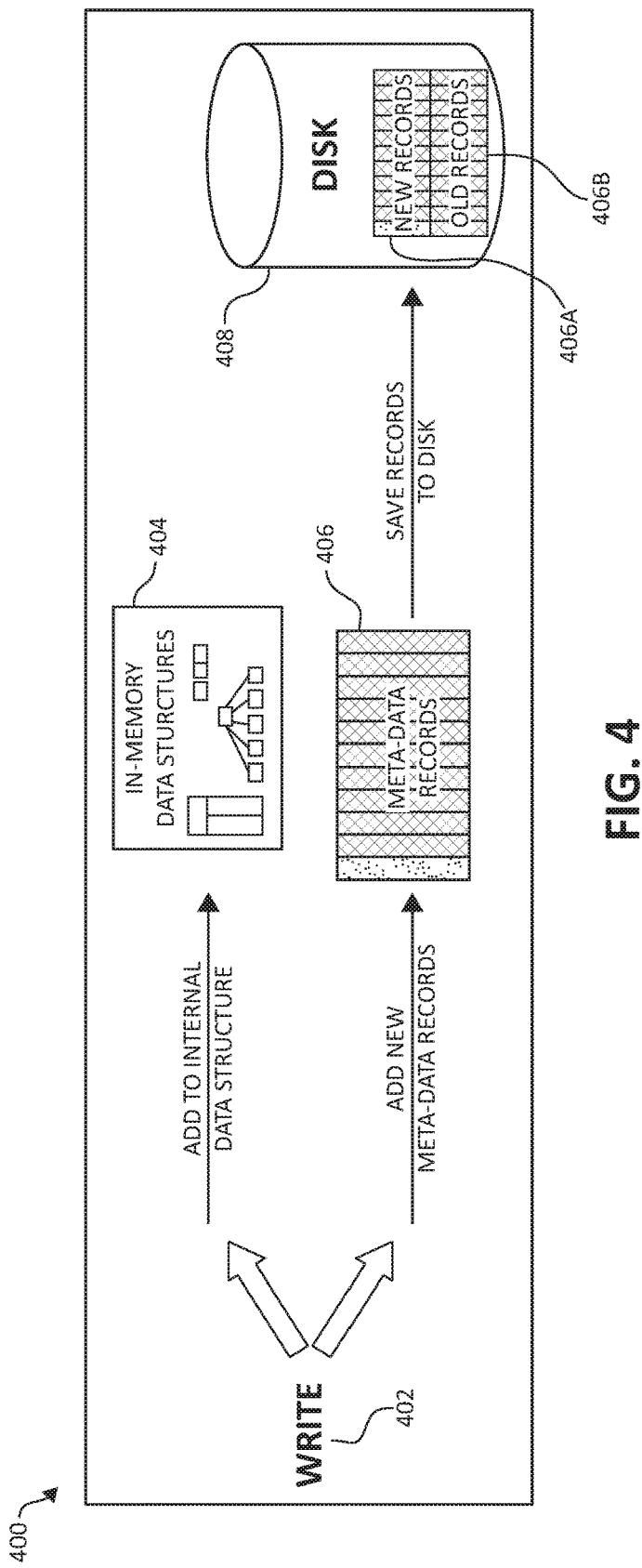
FIG. 4 is a block diagram illustrating a hardware structure of a write operation using journaling in a computer system in which aspects of the present invention may be realized.

FIG. 4 is a block diagram illustrating a hardware structure of a write operation using journaling in a computer system in which aspects of the present invention may be realized. As described in FIG. 4, a write operation 402 flow behaves as a journaling storage system write. When a write command 402 arrives from user, a new meta-data record 406A is created, describing the new write 402. The write command 402 is added to an internal data structure (e.g., an in-memory data structure) 404. The meta-data record 406 (shown generally as 406A and also as the new meta-data records, but the old meta-data records are illustrated as 406B) will be added to previous records (which may include the new records 406A and old records 406B) of the object. After collecting a certain amount of records 406, the records 406 are written to disk 408. At the same time the information about the new write 402 is updated in the object in-memory data structures 404. At any point in time, if the object is closed, the records 406 previously saved to disk 408 can be used to recreate the exact in-memory data structures 404.

Figure 5:
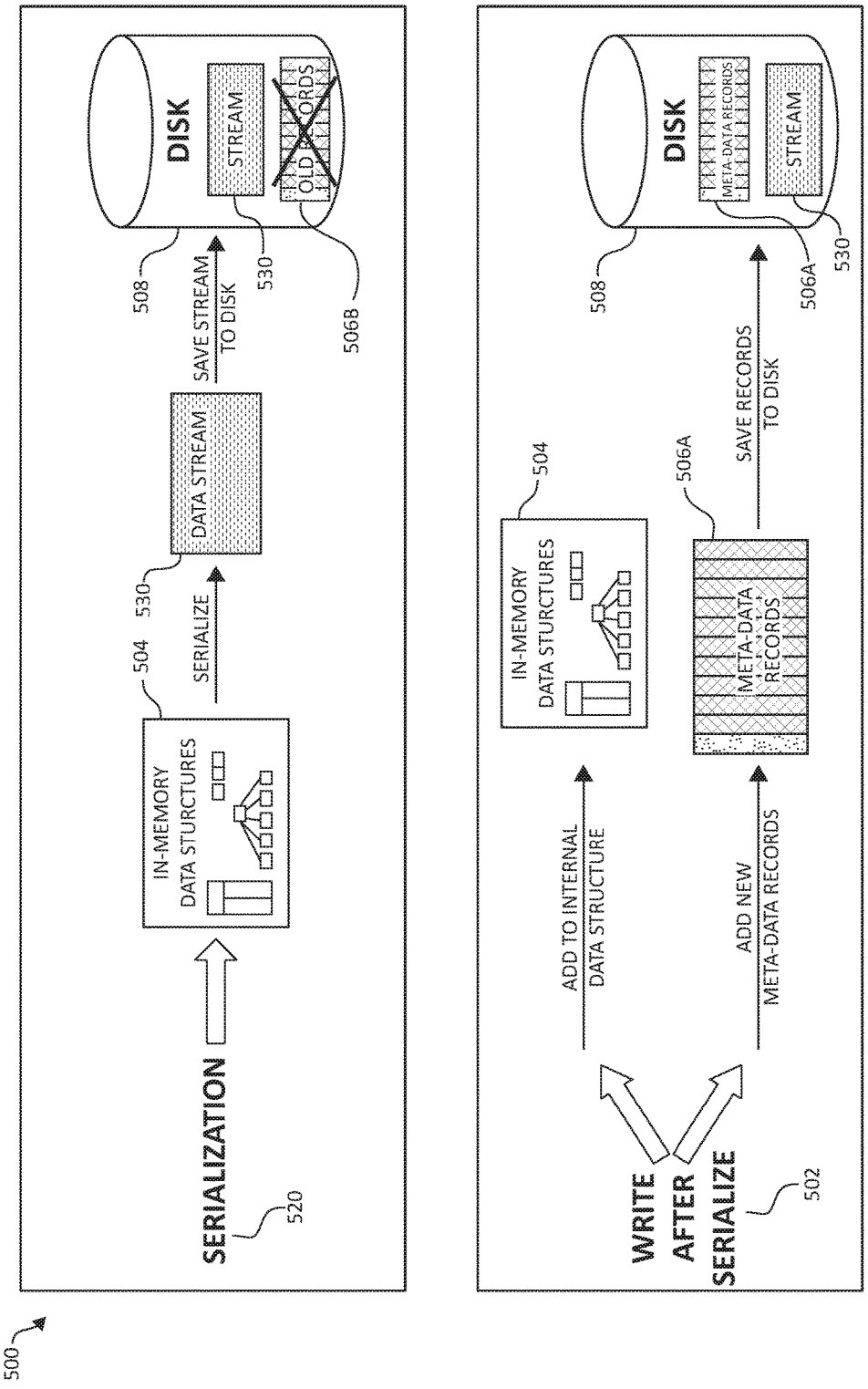
FIG. 5 is a block diagram illustrating a hardware structure of a write operation using serialization and journaling in a computer system in which aspects of the present invention may be realized.

FIG. 5 is a block diagram illustrating a hardware structure 500 of a write operation using serialization and journaling in a computer system in which aspects of the present invention may be realized. For serializing 520 the journal data, when certain conditions are met (conditions may depend on implementation or user-described conditions), while the object is already opened and loaded to memory, the serialization process is invoked. The serialization process reviews the in-memory data structures 504, creates a stream of data 530 (e.g., serialized data) and stores the data stream 530 on the disk 508 in a persistent manner. After saving the serialized data to disk 508, all the previous records 506B saved to disk 508 will be discarded, as well as previous serialized stream data. Any new write operations 502 are delayed during a brief part of the serialization process (e.g., a predetermine time threshold may be set and used or the time necessary/ required to perform the snapshot) to provide a valid and consistent memory snapshot. Once the serialization 520 is over, writes 502 are resumed, and the write operations 502 resume. When the new write command 502 arrives from user, the new meta-data record 506A is created, describing the new write 502. The write command 502 is added to the internal data structure 504. The meta-data record 506A will be added to previous records of the object. After collecting a certain amount of records 506A, the records 506A are written to disk 508. At the same time the information about the new write 502 is updated in the object in-memory data structures 504. At any point in time, if the object is closed, the records 506 previously saved to disk 508 can be used to recreate the exact in-memory data structures 504.

It should be noted that combining journaling and serialization requires adjustments to object loading action, which is now required to deal with two types of meta-data, and also requires fine-tuning for replacing saved journal data with serialized data while keeping data integrity. Also, the combination of serialization and journaling swaps in storage objects. As such, when loading an object from memory, the object information saved to a disk can be in one of three states. The first state represents all of the data saved to a disk is in journal form (e.g., a set of records) before a first serialization action is performed. The second state presents all of the data saved to disk in a data stream form right after a serialization action, with no records in the disk since the records were previously discarded. The third state represents data stored in combined form (both journaling form and serialized form) with both the data stream created by the last or most recent serialization of the journal data and records (e.g., a set of records) representing the writes performed after the serialization will be saved on the disk.

Figure 6:
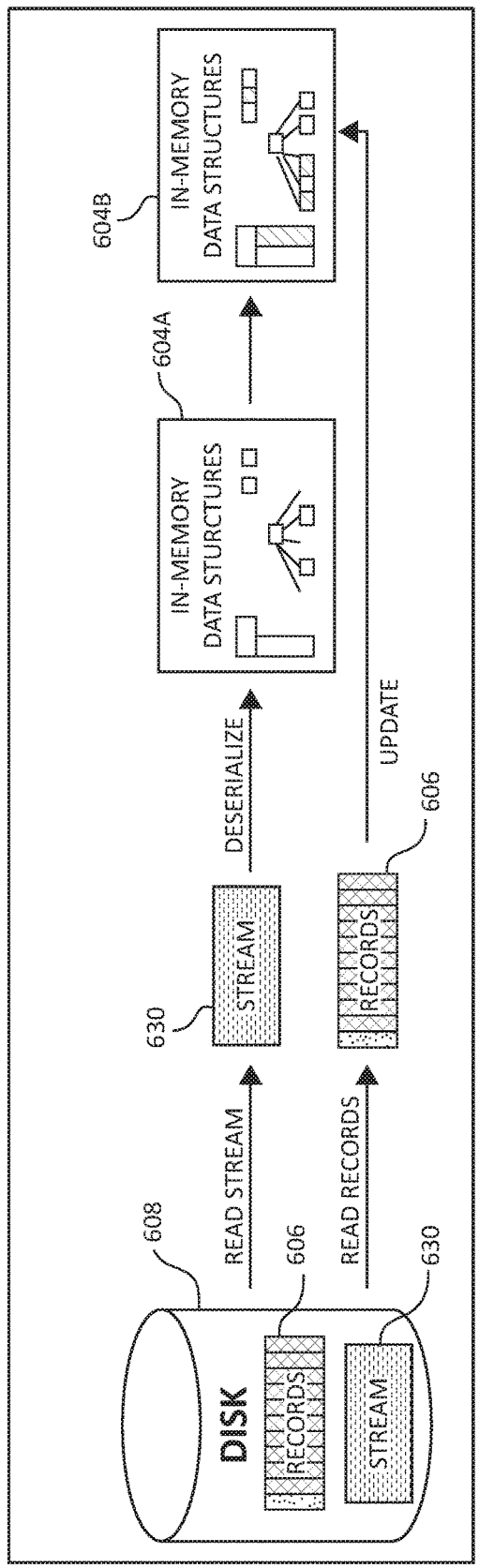
FIG. 6 is a block diagram illustrating a hardware structure of loading a file from a disk in a computer system in which aspects of the present invention may be realized.

Turning now to FIG. 6, a block diagram illustrating a hardware structure 600 of loading a file from a disk in a computer system in which aspects of the present invention may be realized. When a data system starts to load an object from storage, the data system may first search the information saved for an object on a disk 608. The information is read from disk 608 and analyzed if the information is in a serialized form 630 or in journal form 606. If information is in serialized form (e.g., the serialized data stream) 630, all the serialized information 630 is read from disk 608 to memory and then data structures 604 are created from data 630. In other words, the data stream 630 is deserialized and the data structures 604 (e.g., 604A and 604B "in-memory data structures") are built from serialized data 630. When all of the reading of the serialized information 630 is complete, or if there was no serialized information 630 on disk 608 when the system started to load the object from storage, a search for information in journaling form (previous records) 606 is performed. If there are no records 606 saved in the disk, then object is loaded, and user access is allowed. If there are records 606, the data system starts to load an object from storage, and the records 606 are consecutively read one after the other. For each record 606, the relevant changes are updated to the in-memory data structure 604A and/or in-memory data structure 604B. When last record is updated to data structure 604, object loading is done. Any write made to an object after it was re-opened, is added to previous object information.

In one embodiment, the present invention provides for efficient serialization of journal data, by combining serialization with journaling of data into one data storage system on the write operations with a subsequent consolidation for serialization of the journal data. In one embodiment, the present invention combines the serialization with the journaling of the data upon occurrence of one of a plurality of conditions while an object is open and loaded into memory.

In one embodiment, the present invention, for serialization of the journal data, performs at least one of: reviewing an in-memory data structure, creating a data stream and persistently storing the data stream on a disk, discarding all pervious records saved to the disk created from the journaling after saving the data stream, and delaying write operations during the serialization of the journal data for taking a memory snapshot.

In one embodiment, the present invention, for loading an object from the memory, detecting whether the object is in one of a plurality of states, wherein the plurality of states include: a first state representing data saved to the disk as records via the journaling before a first serialization of the journal data, a second state representing all data saved to the disk as the data stream immediately after the serialization of the journal data, wherein there are no records saved to the disk in the second state following the serialization of the journal data, and a third state with the data saved in the disk as a combination of a serialization data and the journal data having both the data stream created during a most recent serialization of the journal data and a set of records representing the write operations performed after the serialization of the journal data.

In one embodiment, the present invention searches data saved for the object on the disk when loading the object from the memory and determining whether the data is one of serialized data and journal data. In one embodiment, the present invention reads the serialized data from the disk to the memory and deserializes the serialized data, wherein a data structure is built from the serialized data.

In one embodiment, the present invention, upon completion of reading the serialized data or if the serialized data does not exist on the disk, searches for the journal data in the disk and loading the object while granting access to the object if the journal data does not exist, wherein if the journal data does exist in the disk: consecutively reads each of the records one after the other, and updates changes made to each of the records in the in-memory data structure, wherein the object completes uploaded when a last record is updated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for efficient serialization of journal data using a processor device in a computing environment, the method comprising:
   combining serialization with journaling of data into one data storage system on a write operation with subsequent consolidation for serialization of the journal data;
   wherein during performing the serialization of the journal data, write operations are delayed for a predetermined time period to allow a consistent memory snapshot to be taken, the predetermined time period ending upon completion of the taking of the consistent memory snapshot at which time the write operations are resumed;
   for serialization of the journal data, performing:
   reviewing an in-memory data structure,
   creating a data stream and persistently storing the data stream on a disk, and
   discarding all previous records saved to the disk created from the journaling after saving the data stream; and
   when loading an object from the disk, detecting when the object previously saved to the disk is in each of a plurality of states and adjusting the loading of the object from the disk commensurate with at least one of two types of metadata comprising journal metadata and serialized metadata, the at least one of two types of metadata corresponding to the particular one of the plurality of states the object is in, wherein the plurality of states include:
   a first state representing data saved to the disk as records via the journaling before a first serialization of the journal data,
   a second state representing all data saved to the disk as the data stream immediately after the serialization of the journal data, wherein there are no records saved to the disk in the second state following the serialization of the journal data, and
   a third state with the data saved in the disk as a combination of a serialization data and the journal data having both the data stream created during a most recent serialization of the journal data and a set of records representing the write operations performed after the serialization of the journal data.

2. The method of claim 1, further including searching data saved for the object on the disk when loading the object from the disk and determining whether the data is one of serialized data and journal data.

3. The method of claim 2, further including reading the serialized data from the disk to the memory and deserialize the serialized data, wherein a data structure is built from the serialized data.

4. The method of claim 3, further including performing at least one of:
   upon completion of reading the serialized data or if the serialized data does not exist on the disk,
   searching for the journal data in the disk and loading the object while granting access to the object if the journal data does not exist, wherein if the journal data does exist in the disk:
   consecutively reading each of the records one after the other, and
   updating changes made to each of the records in the in-memory data structure, wherein the object completes uploaded when a last record is updated.

5. A system for efficient serialization of journal data in a computing environment, the system comprising:
   at least one processor device operable in the computing environment, wherein the at least one processor device:
   combines serialization with journaling of data into one data storage system on a write operation with subsequent consolidation for serialization of the journal data;
   wherein during performing the serialization of the journal data, write operations are delayed for a predetermined time period to allow a consistent memory snapshot to be taken, the predetermined time period ending upon completion of the taking of the consistent memory snapshot at which time the write operations are resumed,
   for serialization of the journal data, performs:
   reviewing an in-memory data structure,
   creating a data stream and persistently storing the data stream on a disk, and
   discarding all previous records saved to the disk created from the journaling after saving the data stream, and
   when loading an object from the disk, detects when the object previously saved to the disk is in each of a plurality of states and adjusts the loading of the object from the disk commensurate with at least one of two types of metadata comprising journal metadata and serialized metadata, the at least one of two types of metadata corresponding to the particular one of the plurality of states the object is in, wherein the plurality of states include:
   a first state representing data saved to the disk as records via the journaling before a first serialization of the journal data,
   a second state representing all data saved to the disk as the data stream immediately after the serialization of the journal data, wherein there are no records saved to the disk in the second state following the serialization of the journal data, and
   a third state with the data saved in the disk as a combination of a serialization data and the journal data having both the data stream created during a most recent serialization of the journal data and a set of records representing the write operations performed after the serialization of the journal data.

6. The system of claim 5, wherein the at least one processor device searches data saved for the object on the disk when loading the object from the disk and determining whether the data is one of serialized data and journal data.

7. The system of claim 6, wherein the at least one processor device reads the serialized data from the disk to the memory and deserialize the serialized data, wherein a data structure is built from the serialized data.

8. The system of claim 7, wherein the at least one processor device performs at least one of:
   upon completion of reading the serialized data or if the serialized data does not exist on the disk,
      searching for the journal data in the disk and loading the object while granting access to the object if the journal data does not exist, wherein if the journal data does exist in the disk:
         consecutively reading each of the records one after the other, and
         updating changes made to each of the records in the in-memory data structure, wherein the object completes uploaded when a last record is updated.

9. A computer program product for efficient serialization of journal data using a processor device, the computer program product comprising a non-transitory computer-readable storage medium having computer-readable program code portions stored therein, the computer-readable program code portions comprising:
   a first executable portion that combines serialization with journaling of data into one data storage system on a write operation with subsequent consolidation for serialization of the journal data;
   wherein during performing the serialization of the journal data, write operations are delayed for a predetermined time period to allow a consistent memory snapshot to be taken, the predetermined time period ending upon completion of the taking of the consistent memory snapshot at which time the write operations are resumed;
   a second executable portion that, for serialization of the journal data, performs:
   reviewing an in-memory data structure,
   creating a data stream and persistently storing the data stream on a disk, and
   discarding all previous records saved to the disk created from the journaling after saving the data stream; and
   a third executable portion that, when loading an object from the disk, detects when the object previously saved to the disk is in each of a plurality of states and adjusts the loading of the object from the disk commensurate with at least one of two types of metadata comprising journal metadata and serialized metadata, the at least one of two types of metadata corresponding to the particular one of the plurality of states the object is in, wherein the plurality of states include:
      a first state representing data saved to the disk as records via the journaling before a first serialization of the journal data,
      a second state representing all data saved to the disk as the data stream immediately after the serialization of the journal data, wherein there are no records saved to the disk in the second state following the serialization of the journal data, and
      a third state with the data saved in the disk as a combination of a serialization data and the journal data having both the data stream created during a most recent serialization of the journal data and a set of records representing the write operations performed after the serialization of the journal data.

10. The computer program product of claim 9, further includes a fifth executable portion that searches data saved for the object on the disk when loading the object from the disk and determining whether the data is one of serialized data and journal data.

11. The computer program product of claim 10, further includes a sixth executable portion that performs at least one of:
   reading the serialized data from the disk to the memory and deserialize the serialized data, wherein a data structure is built from the serialized data,
   upon completion of reading the serialized data or if the serialized data does not exist on the disk,
      searching for the journal data in the disk and loading the object while granting access to the object if the journal data does not exist, wherein if the journal data does exist in the disk:
         consecutively reading each of the records one after the other, and
         updating changes made to each of the records in the in-memory data structure, wherein the object completes uploaded when a last record is updated.

* * * * *